Patented May 13, 1930

1,758,855

UNITED STATES PATENT OFFICE

ROBERT EMANUEL SCHMIDT AND BERTHOLD STEIN, OF ELBERFELD, GERMANY, ASSIGNORS TO GENERAL ANILINE WORKS, INC., OF NEW YORK, N. Y., A CORPORATION OF DELAWARE

MANUFACTURE OF 2-7 DINITRO-ANTHRAQUINONE

No Drawing. Application filed June 28, 1926, Serial No. 119,198, and in Germany June 25, 1925.

Our invention consists in substantially pure 2-7 dinitro-anthraquinone of a high melting point and in the process of making the same.

The nitration of anthraquinone is described in the German Patent 167,699 and it is stated therein that by acting with nitric acid and concentrated sulfuric acid upon anthraquinone, 1-5 and 1-8 dinitro-anthraquinone are obtained as the main products of the reaction, with a large percentage of other isomers amongst which the beta-beta appear only in insignificant amounts. 2-7 dinitro-anthraquinone is also described there as being hardly colored flat needles when crystallized from glacial acetic acid and melting at 262° C.

We have now found that the nitration of anthrone of the formula

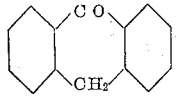

leads to introduction of nitro-groups mainly into the beta position. From the reaction mass an intermediate product can be isolated of which the constitution is not perfectly known but if this is treated, for instance with glacial acetic acid at boiling temperature, nitrous acid is evolved and substantially pure 2-7 dinitro-anthraquinone is obtained. By recrystallizing this product from glacial acetic acid it is obtained in long yellow needles melting at 284/285° C. By reduction it is transformed into the well known 2-7 diamino-anthraquinone, which is soluble in sulfuric acid with yellow color, does not give any reaction with formaldehyde and dissolves in 45% oleum with a honey-yellow color. The melting point makes it appear that our 2-7 dinitro-anthraquinone must be different from the product described previously in the literature as being the 2-7 dinitro-anthraquinone. The transformation of our product into the diamino-anthraquinone is relied upon as a proof of its constitution and purity.

The nitration is effected preferably with concentrated nitric acid and in the absence of sulfuric acid. By carrying out this reaction at below room temperature, and pouring the reaction mass into glacial acetic acid the above mentioned intermediate compound separates as colorless needles. It is also possible to dilute carefully the nitration mass with water, in which case the intermediate compound will likewise separate. This intermediate compound is then isolated and boiled up in an acid medium, preferably with glacial acetic acid or acetic anhydride. The other nitration products remain in solution in this procedure. It allows of an easy separation of the 2-7 dinitro compound from the other reaction products.

The following example will further illustrate our invention, the parts being by weight:

*Example.*—10 parts anthrone are gradually introduced at a temperature from 0 to 5° C. into 100 parts 9.5% nitric acid, then stirring the reaction mass for another hour at about 5°. The reaction mass is then, with cooling, poured into 200 parts glacial acetic acid, and the intermediate compound separates as colorless needles. These are after some time filtered off and washed with glacial acetic acid. The filter cake is then boiled up with 200–300 parts glacial acetic acid until the evolution of nitrous acid has ceased. The 2-7 dinitro-anthraquinone separates and is filtered off. It is recrystallized from glacial acetic acid, or nitrobenzol, and is obtained as yellow needles of a melting point of 284/285° C. By reduction the 2-7 diamino-anthraquinone is obtained, which dissolves in sulfuric acid with yellow color, and in 45% oleum with a honey-yellow color, and which does not give any reaction with formaldehyde.

We claim:

1. In processes of making 2-7 dinitro-anthraquinone the step of nitrating anthrone with concentrated nitric acid at below room temperature in the absence of diluents.

2. In processes of making 2-7 dinitro-anthraquinone the steps comprising nitrating anthrone with concentrated nitric acid at below room temperature and boiling the intermediate compound thus formed with an acid reagent of the group consisting of glacial acetic acid and acetic anhydride.

3. In processes of making 2-7 dinitro-anthraquinone the steps comprising nitrating anthrone with concentrated nitric acid at a temperature from 0° to about 5° C., and boiling the intermediate compound thus formed with glacial acetic acid.

In testimony whereof we have hereunto set our hands.

ROBERT EMANUEL SCHMIDT.
BERTHOLD STEIN.